R. C. FEILE.
AXLE CLUTCH.
APPLICATION FILED MAR. 25, 1909.

967,006.

Patented Aug. 9, 1910.

Robert C. Feile, Inventor

UNITED STATES PATENT OFFICE.

ROBERT C. FEILE, OF REEDSVILLE, WISCONSIN.

AXLE-CLUTCH.

967,006.  Specification of Letters Patent.  Patented Aug. 9, 1910.

Application filed March 25, 1909. Serial No. 485,624.

*To all whom it may concern:*

Be it known that I, ROBERT C. FEILE, of Reedsville, Wisconsin, have invented an Axle-Clutch, of which the following is a specification.

This invention relates to driving clutches or devices of that class which are used for connecting a driving with a driven element in such manner that the driving element can drive the driven element in either direction, but the latter cannot act in any way upon the former and is free to overrun the drive or to move independently of the driving element when not being driven. Such devices are especially applicable to the wheels of motor-vehicles, where it is desirable to allow the wheels to run free at times when the motor is standing still, to enable one wheel to overrun the other as when turning a corner, and to enable such action to take place in either the forward or backward direction.

The object of my invention is to provide a device of maximum simplicity and strength which shall be able to accomplish the desired results with greater perfection than anything heretofore constructed.

In my invention I utilize the bearing-friction between one of the clutch-elements and the supporting journal for the axle to effect a positive engagement between the clutch-elements, and in like manner for disengaging the clutch-elements when it is desired that the wheel shall run free.

My invention is best understood by a concrete illustration thereof, which is given in the accompanying drawings, reference being had to the following description thereof.

Figure 1:
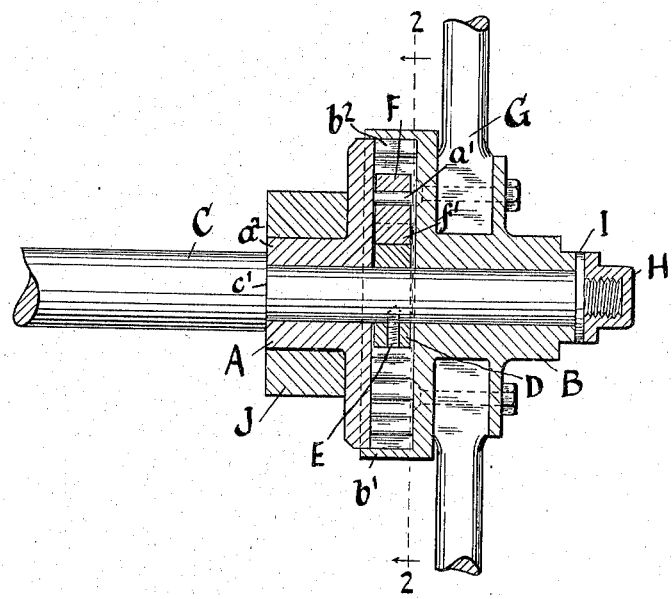
Figure 2:
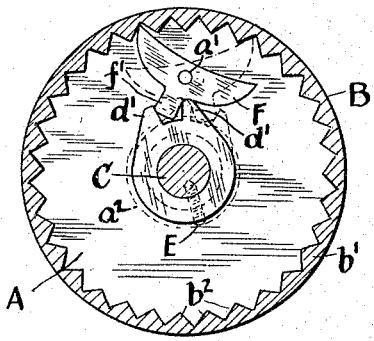
Figure 3:
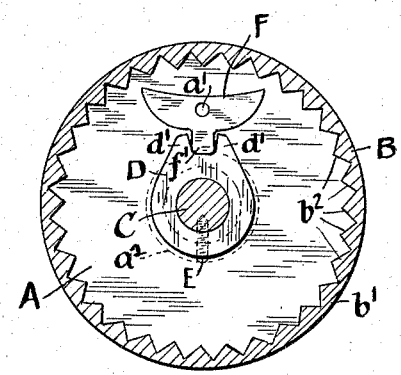

In these drawings Figure 1 is a longitudinal section through the hub of a wheel provided with my clutch-device, and Figs. 2 and 3 are transverse sections on the plane 2, showing the clutch in the driving and loose-running positions, respectively.

In these drawings every reference letter and numeral refers always to the same part.

My invention comprises in its essentials, the two clutch-elements A and B, each loosely mounted to rotate upon the driving-axle C; the toothed collar D which is fixed to the axle in any suitable manner as by a pin E; and the clutch pawl F, which is pivoted upon a pin $a'$ carried on the face of the clutch-disk A, and has a tooth $f'$ which engages between two teeth $d'$ formed on the collar D. As appears from the drawings, the clutch-disk B forms the driven element, in this case the hub of a wheel G, whose spokes are attached thereto, and the two clutch-elements are confined against endwise play by a shoulder $c'$ at one end and a terminal nut H at the other, which latter is protected from the turning action of the wheel by a washer I. The clutch-member B is provided with a marginal flange $b'$ inclosing the space between the two members and thus keeping out dust, and said marginal flange is provided on its inner face with ratchet-teeth $b^2$ in position for engagement with the pawl F when the latter is turned into one of the positions shown in full and dotted lines in Fig. 2.

The clutch-member A has a hub $a^2$ which forms the journal supporting the wheel and axle, and for this of course is provided a suitable bearing-box J of any desired form and dimensions. It will be noted that the position of the pawl F is conditioned upon the relative position of the axle C and the clutch-member A, so that a slight relative rotation between these two elements causes the pawl F to shift from the full to the dotted-line position of Fig. 2, or vice versa; in the former of which it engages the wheel-element B to drive it in one direction, and in the latter in the opposite direction; while when the pawl is in its center position, as shown in Fig. 3, it is entirely out of engagement with the driven element.

To produce the relative movement between the member A and shaft C necessary to produce an engagement between the two clutch-members, the journal-friction of the member A is depended on. The resistance to turning of the member A is naturally somewhat greater than that of the member C within the member A, because the diameter of the journal is greater. Hence any driving effort in either direction of the member C is necessarily followed by a movement of the pawl F into the corresponding driving-position; after which the two clutch-members and wheel are driven together with the axle. Should the driving-effort of the axle be reversed, the pawl F immediately changes its position to the other side, and the wheel is driven in the opposite direction, or is effectively braked in the direction in which it is going. When it is desired to allow the wheels to run free, it is simply necessary to produce a slight reversing-movement of the axle sufficient to carry the pawl F into the middle position, whereupon the wheels run independently of the axle. Of course in driving in either direction, one wheel is free to turn faster than the other where the conditions require it, as when turning a corner, by the pawl simply slipping over the ratchet teeth.

I employ no ball bearings which would tend to lessen the friction. In my device, the journal friction is greater between the clutch-element and the stationary bearing because of the greater radius of distance from the axis at which it is applied. This is essential for the reason that it causes the clutch to act instantly as soon as the axle begins to turn.

Various changes and modifications in the construction as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. The combination of a driving shaft, two clutch-elements mounted thereupon for free movement, one of said clutch elements having a journal and the other constituting the driven element, ratchet teeth on the driven element, a pawl pivotally mounted on the other element for engagement with said ratchet teeth, and a collar non-rotatably mounted on said shaft and having means for coöperation with said pawl, and a stationary journal bearing other than the driven element receiving said journal and against which the journal of the driving clutch-element frictionally engages to cause the clutch to act instantly as soon as the shaft begins to turn.

2. The combination of a driving axle, a clutch-element mounted thereon and having a journal, a bearing other than the driven element in which said journal turns, a pawl pivotally mounted on said clutch element and having oppositely directed noses, a driven element rotatably mounted on said shaft and having ratchet teeth disposed concentrically with said shaft and in position for engagement with either of the noses of said pawl whereby the latter is adapted to engage them operatively to drive the driven element in either direction, friction means for causing the clutch to act instantly upon movement of the axle and a connection between said pawl and said shaft whereby any relative movement between said shaft and clutch-element shifts the pawl into the corresponding driving position; both noses of said pawl being disengaged from said teeth when said pawl is in its middle position.

3. The combination of a driving shaft, a clutch-element loosely mounted thereon and having a journal, a bearing-box separate from the driven element in which the journal turns and with which the journal of said clutch-element frictionally engages to cause instant application of the clutch upon rotation of the shaft, a second clutch-element which constitutes the driven element loosely mounted on said shaft and having a set of annular ratchet-teeth, a pawl pivotally mounted on said first clutch-element in position for engaging said ratchet teeth, and an operative connection between said pawl and shaft.

4. The combination of a driving shaft, a clutch-element loosely mounted thereon and having a journal, a bearing-box separate from the driven element in which the journal turns and with which the journal of said clutch-element frictionally engages to cause instant application of the clutch upon rotation of the shaft, a second clutch-element which constitutes the driven element loosely mounted on said shaft and having a set of annular ratchet-teeth, a double-nosed pawl pivotally mounted on said first clutch-element in position for engaging said ratchet-teeth, and an operative connection between said pawl and shaft whereby a driving effort of the shaft in either direction produces a turning of the pawl into the corresponding driving-direction.

5. The combination of a driving shaft, a clutch element loosely mounted thereon and having a plane face and a journal, a bearing-box in which said journal turns and with which the journal of said clutch-element frictionally engages to cause instant application of the clutch upon rotation of the shaft, a second clutch-element which forms the driven element loosely mounted on said shaft and having a plane face opposing the said plane face of said first element and having further a marginal cylindrical flange inclosing the space between the two elements, said flange having a plurality of ratchet-teeth on its inner face, a double-nosed pawl pivotally mounted on said first element in position for operatively engaging the said ratchet-teeth in either direction, and an operative connection between said shaft and said pawl.

6. The combination of a driving shaft, a clutch-element loosely mounted thereon and having a plane face and a journal, a bearing-box in which said journal turns and with which the journal of said clutch-element frictionally engages to cause instant application of the clutch upon rotation of the shaft, a second clutch-element which forms the driven element loosely mounted on said shaft and having a plane face opposing the said plane face of said first element and having further a marginal cylindrical flange inclosing the space between the two elements, said flange having a plurality of ratchet-teeth on its inner face, a double-nosed pawl pivotally mounted on said first element in position for operatively engaging the said ratchet-teeth in either direction, said pawl having a projection toward said shaft, and a collar immovably mounted on said shaft and having means for engaging said projection, so as to cause a turning movement of said pawl in the opposite direction from the turning movement of said shaft.

7. The combination with a driving shaft of a journal bearing supporting the same, a third element loosely mounted on said shaft and having a hub intercalated between said shaft and journal bearing whereby the pressure of said shaft is transmitted through said hub, a driven element free from any frictional connection with and out of contact with said third element whereby it exercises no rotative tendency upon it, a pawl pivotally mounted on said third element and coacting with said driven element to grip the latter when slightly rotated from a predetermined position about its pivot, and an operative connection between said shaft and pawl adapted to rotate the latter whenever any rotative movement between said shaft and third element takes place.

8. The combination of a driving shaft, a clutch-element loosely mounted thereon and having a journal, a bearing box separate from the driven element and in which the journal turns and with which the journal of said clutch-element frictionally engages to cause instant application of the clutch upon rotation of the shaft, a second clutch-element which constitutes the driven element loosely mounted on said shaft and having a clutch rim, a double nosed pawl pivotally mounted on said first clutch-element in position for engaging said clutch-rim, and an operative connection between said pawl and shaft, whereby a driving effort of the shaft in either direction produces a turning of the pawl into the corresponding driving direction.

In witness whereof I have hereunto set my hand this 22nd day of March, 1909.

ROBERT C. FEILE.

Witnesses:
   OLD. LINETHY,
   CHAS. HEIN.